United States Patent
Kashar

(10) Patent No.: US 9,685,052 B2
(45) Date of Patent: *Jun. 20, 2017

(54) SYSTEM AND METHOD FOR ALERTING A USER

(71) Applicant: Alexis Ander Kashar, Scarsdale, NY (US)

(72) Inventor: Alexis Ander Kashar, Scarsdale, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/088,669

(22) Filed: Apr. 1, 2016

(65) Prior Publication Data

US 2016/0217662 A1 Jul. 28, 2016

Related U.S. Application Data

(63) Continuation-in-part of application No. 14/153,411, filed on Jan. 13, 2014, and a continuation-in-part of
(Continued)

(51) Int. Cl.
| | | |
|---|---|---|
| *G09B 21/00* | (2006.01) | |
| *G08B 7/06* | (2006.01) | |
| *G04G 21/04* | (2013.01) | |
| *G05B 15/02* | (2006.01) | |
| *G04G 13/02* | (2006.01) | |
| *G08B 5/36* | (2006.01) | |
| *G08B 6/00* | (2006.01) | |

(Continued)

(52) U.S. Cl.
CPC .......... *G08B 7/06* (2013.01); *G04G 13/02* (2013.01); *G04G 21/04* (2013.01); *G05B 15/02* (2013.01); *G08B 5/36* (2013.01); *G08B 6/00* (2013.01); *G08B 7/00* (2013.01); *G09B 21/009* (2013.01); *G04G 13/028* (2013.01); *G08B 17/00* (2013.01)

(58) Field of Classification Search
CPC . A61J 7/0481; A61J 2007/0436; G05B 15/02; G08B 21/009; G08B 21/22; G08B 21/0423; G08B 21/0446; G08B 21/0453; G08B 21/0461; G08B 21/0469; G08B 6/00; G08B 1/08; G04G 13/02; G04G 13/026; G04G 13/028; G04G 11/00; G04G 21/04
USPC ...................................... 340/4.12
See application file for complete search history.

(56) References Cited

U.S. PATENT DOCUMENTS

| | | |
|---|---|---|
| 4,365,238 A | 12/1982 | Kollin |
| 4,853,674 A | 8/1989 | Kiss |

(Continued)

OTHER PUBLICATIONS

Ethan, Seth, and Jeff; "Baboomi: A Customizable and Comfortable Alarm";https://www.kickstarter.com/projects/215279222/baboomi-a-customizable-and-comfortable-alarm?ref=live; Sep. 27, 2013; 18 pages.

(Continued)

*Primary Examiner* — Firmin Backer
*Assistant Examiner* — Adnan Aziz
(74) *Attorney, Agent, or Firm* — James E. Walton

(57) ABSTRACT

The alarm monitoring system provides various alerts of events that are not readily discernable to those individuals that are deaf or hard of hearing. The system generates visual, vibratory, and high decibel alerts separately or in combination to alert the user to a wide variety of events in combination with a vibratory illuminating puck shaped device and allows a user to filter out alerts based upon a variety of modifiers.

15 Claims, 8 Drawing Sheets

Related U.S. Application Data application No. 14/252,216, filed on Apr. 14, 2014, and a continuation-in-part of application No. PCT/US2015/011080, filed on Jan. 13, 2015.

(60) Provisional application No. 62/149,923, filed on Apr. 20, 2015.

(51) Int. Cl.
  *G08B 7/00* (2006.01)
  *G08B 17/00* (2006.01)

(56) References Cited

U.S. PATENT DOCUMENTS

| | | | |
|---|---|---|---|
| 5,651,070 A | 7/1997 | Blunt | |
| 5,737,692 A * | 4/1998 | Lang | G04G 13/02 340/407.1 |
| 5,867,105 A | 2/1999 | Hajel | |
| 5,917,420 A | 6/1999 | Gonzalez | |
| 6,288,642 B1 | 9/2001 | Dohrmann | |
| 6,369,312 B1 * | 4/2002 | Komatsu | G10H 1/00 381/150 |
| 6,384,724 B1 | 5/2002 | Landais | |
| 6,624,750 B1 | 9/2003 | Marman | |
| 6,867,688 B2 | 3/2005 | Lamb | |
| 7,015,807 B2 | 3/2006 | Roby et al. | |
| 7,129,833 B2 | 10/2006 | Albert | |
| 7,148,797 B2 | 12/2006 | Albert | |
| 7,170,397 B2 | 1/2007 | Roby et al. | |
| 7,173,881 B1 | 2/2007 | Freudenberg, Jr. et al. | |
| 7,227,463 B2 | 6/2007 | Merrell | |
| 7,785,257 B2 * | 8/2010 | Mack | A61B 5/024 600/300 |
| 7,996,046 B2 * | 8/2011 | Vargas | H04M 1/72533 455/550.1 |
| 8,452,345 B2 * | 5/2013 | Lee | G06F 3/016 340/407.1 |
| 8,489,065 B2 * | 7/2013 | Green | H04W 4/12 348/143 |
| 8,860,563 B2 * | 10/2014 | Cruz-Hernandez | G06F 3/016 340/407.1 |
| 8,923,804 B1 * | 12/2014 | Aldridge, II | H04W 4/008 455/404.1 |
| 2002/0186618 A1 * | 12/2002 | Kirkpatrick | G04G 13/026 368/11 |
| 2003/0117272 A1 | 6/2003 | Fegley | |
| 2004/0168565 A1 * | 9/2004 | Nagao | G10H 1/0041 84/633 |
| 2004/0219928 A1 * | 11/2004 | Deeds | H04M 1/2745 455/456.1 |
| 2004/0222879 A1 * | 11/2004 | Sawyer | G08B 6/00 340/407.1 |
| 2005/0152325 A1 * | 7/2005 | Gonzales | H04M 19/04 370/338 |
| 2006/0011042 A1 * | 1/2006 | Brenner | G10H 1/0008 84/600 |
| 2006/0067165 A1 | 3/2006 | Chan | |
| 2006/0226973 A1 * | 10/2006 | Catlin | G08B 17/10 340/539.11 |
| 2007/0001825 A1 | 1/2007 | Roby | |
| 2007/0216537 A1 | 9/2007 | Park | |
| 2007/0299374 A1 * | 12/2007 | Gesotti | A61H 23/02 601/79 |
| 2008/0012716 A1 | 1/2008 | Saltzstein | |
| 2008/0111677 A1 | 5/2008 | Kolz | |
| 2008/0143517 A1 | 6/2008 | Goffin | |
| 2009/0303031 A1 * | 12/2009 | Strohallen | G08B 25/10 340/501 |
| 2009/0315488 A1 * | 12/2009 | Shyu | H04M 19/04 318/114 |
| 2010/0039266 A1 * | 2/2010 | Faris | G08B 21/24 340/572.4 |
| 2010/0060466 A1 | 3/2010 | Austin | |
| 2010/0145167 A1 | 6/2010 | Im | |
| 2010/0195447 A1 * | 8/2010 | George | G04G 21/00 368/13 |
| 2011/0021147 A1 | 1/2011 | Tout | |
| 2011/0059769 A1 * | 3/2011 | Brunolli | G08C 17/02 455/556.1 |
| 2011/0153197 A1 * | 6/2011 | Song | A61B 5/1038 701/533 |
| 2011/0267196 A1 * | 11/2011 | Hu | A61B 5/0002 340/575 |
| 2013/0040610 A1 * | 2/2013 | Migicovsky | H04L 1/1867 455/412.2 |
| 2013/0043988 A1 * | 2/2013 | Bruno | G04G 13/02 340/407.1 |
| 2013/0100017 A1 * | 4/2013 | Papakipos | H04L 12/1845 345/158 |
| 2014/0097953 A1 * | 4/2014 | Jelveh | G08B 19/00 340/517 |
| 2014/0106677 A1 * | 4/2014 | Altman | H04B 1/3827 455/41.2 |
| 2014/0266571 A1 * | 9/2014 | Sharma | G09B 21/003 340/4.12 |
| 2014/0313040 A1 * | 10/2014 | Wright, Sr. | G08B 17/10 340/628 |
| 2014/0366273 A1 * | 12/2014 | Davis, II | G04G 13/02 5/639 |

OTHER PUBLICATIONS

Greg Livadas; "Waking up may soon be a lot easier for deaf and hard-of-hearing individuals RIT/NTID students win $5,000 in 'The Next Big Id' innovation competition";http://www.rit.edu/news/story.php?id=50770#.U207Cd_fK9A.facebook; May 9, 2014; 2 pages.

Greg Livadas; "Sonic-connect™ USB Media Alert—On Sale Now"; http://www.chs.ca/products/sonic-connecttm-usb-media-alert; Apr. 29, 2014; 2 pages.

International Search Report and Written Opinion of the International Searching Authority dated Jul. 16, 2015 from counterpart PCT App. No. PCT/US15/11080.

International Preliminary Report on Patentability dated Nov. 9, 2015 from counterpart PCT App. No. PCT/US15/11080.

Patty Singer; "RIT students develop alarm clock for the deaf"; http://www.democratandchronicle.com/story/news/2014/05/24/rit-students-develop-alarm-clock-deaf/9547301/; 3 pages.

Office Action from corresponding U.S. Appl. No. 14/153,411 dated Aug. 26, 2015.

Final Office Action from corresponding U.S. Appl. No. 14/153,411 dated Mar. 11, 2016.

Amendment from corresponding U.S. Appl. No. 14/153,411 dated Nov. 27, 2015.

* cited by examiner

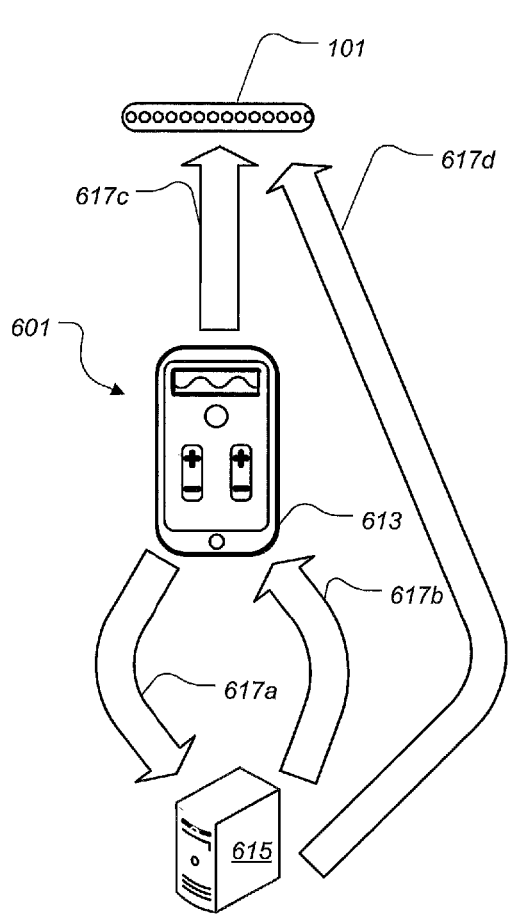 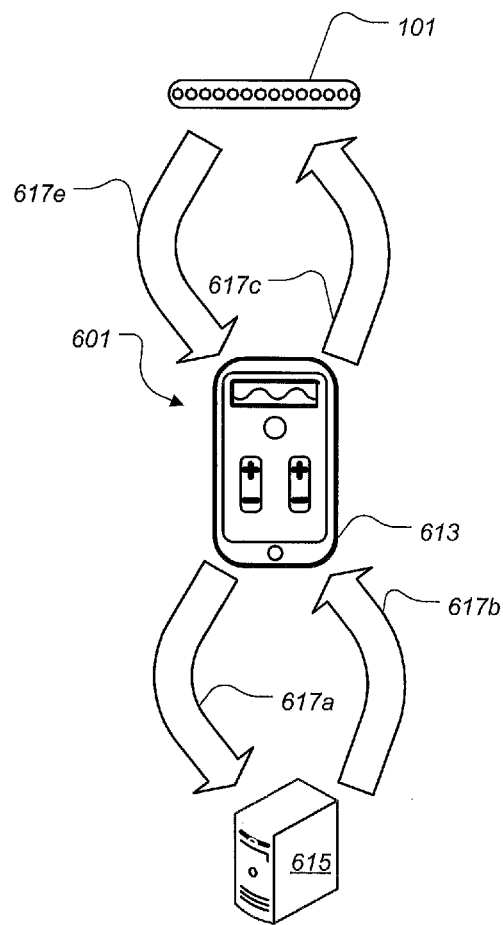
FIG. 6A   FIG. 6B

SYSTEM AND METHOD FOR ALERTING A USER

CROSS REFERENCE TO RELATED APPLICATIONS

This application is a continuation-in-part of U.S. application Ser. No. 14/153,411, filed 13 Jan. 2014, titled "Alarm Monitoring System," a continuation-in-part of U.S. application Ser. No. 14/252,216, filed 14 Apr. 2014, titled "System and Method for Alerting a User," a continuation-in-part of P.C.T. Application No. PCT/US2015/011080, filed 13 Jan. 2015, titled "System and Method for Alerting a User," and claims the benefit of U.S. Application No. 62/149,923, filed 20 Apr. 2015, titled "System and Method for Alerting a User," all of which are hereby incorporated by reference for all purposes as if fully set forth herein.

BACKGROUND

1. Field of the Invention

The present invention relates in general to the field of devices supporting those with the need to receive customized alerts in a variety of methods from a combination software application in conjunction with a wireless puck, device, or standalone puck that vibrates and flashes in response to a variety of alerts, such as emergency and non-emergency alerts, from software running on smart phones, computers, and computer tablets.

2. Description of Related Art

There are many designs of systems for alerting users of an event. Typically, a user sets an alarm on their phone or alarm clock and when the time is right, the alarm clock or phone will alert them to the event. Furthermore, users get alerts from text messages, social media notifications, phone calls, voice mails, emails, and emergency alert notifications to notify the user of a multitude of events. However, critical alerts can be inadvertently overlooked. While there are many systems for alerting users well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6A is a flowchart of an alternative embodiment of a software application according to the present application;

FIG. 6B is a flowchart of an alternative embodiment of a software application according to the present application;

Figure 1A:
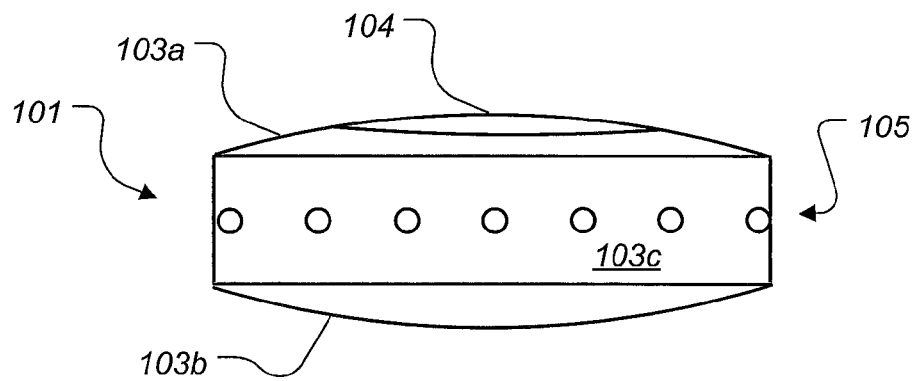
FIG. 1A is a side view of a preferred embodiment of an alerting apparatus according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the apparatus for alarm and alert monitoring are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1A in the drawings, a preferred embodiment of an apparatus 101 for alerting a user according to the present application is illustrated. Apparatus 101 or puck 101 is a circular shaped device suitable for being placed preferably adjacent a mattress, under a mattress, or a pillow to alert a user to a specified event. The vibrations produced from puck 101 are suitable for vibrating a bed with enough force to awaken a sleeping adult. While many cellular phones can produce vibrations in response to phone calls and text messages, the vibrations produced by a cell phone are designed to alert an awake user carrying the phone. Vibrations produced by cell phones are not capable of awaking users. For example, a pillow reduces the amplitude of vibrations of phone placed underneath them by absorbing the strength of the vibrations of a phone placed underneath it, making the phone ineffective at awakening a sleeping user. Puck 101 is portable and configured to be placed and carried in a pocket, therefore users carrying vibratory pad or puck 101 in their pocket are able to be notified under conditions where their phone would not have sufficient vibratory strength to alert them, such as while working in high-vibration environments (i.e., operating farm machinery or construction equipment), or while wearing loose or bulky clothing which could mask normal vibrations. Furthermore, vibrations from current cell phones do not provide those that are deaf or hard of hearing with the ability to selective limit, or filter, which alerts and phone calls vibrate the phone. Puck 101 provides alerts separate from phones in the forms of internally and externally flashing lights and vibrations both configured to wake users. It should be apparent that other locations, such as a night stand or other location where the puck 101 would be observed and/or felt, are suitable for use. For example a user carrying vibratory pad or puck 101 in their pocket is able to be notified of things that their phone couldn't notify them of, such as an alert from federal agency not sent as a text message. A user in a library places the puck 101 on a desk surface so that they can feel the alerts without disrupting other library visitors. A user in a car is provided with unique vibration to be alerted to specific things without regard to the amount of road noise by placing a puck 101 in a cup holder or in their lap. Puck 101 includes an upper surface 103a and a lower surface 103b. Where the upper surface 103a and the lower surface 103b meet is an outer surface 103c. Upper surface 103a or lower surface 103b includes a lid 104 that allows a user access inside the puck. For example, the user can remove the lid 104 to replace the power source or to change settings by flipping internally located switches, alternatively settings can be programmed remotely. While a circular shape has been shown, it should be apparent that other shapes are contemplated by this application, including but limited to a square shape, a rectangular shape, both with and without rounded corners. Alternatively, upper surface 103a and lower surface 103b may be coated, molded, dipped, and/or formed in a friction increasing layer such as rubber. The friction increasing layer reduces the chance the puck is unintentionally moved. The surfaces of puck 101, such as upper surface 103a, may be constructed from various materials, including but not limited to plastic, wood, metal, laminates, or carbon fiber, and may come in different colors, and may include various graphics, images, or patterns that the user can choose from, in order to have a puck that is distinctive in style or that suits a user's decorating preferences.

Puck 101 may include a series of lights 105 located on the outer surface 103c for providing visual alerts to users by flashing lights. In alternative embodiments, the lights 105 are inside the surface 103c and the light is piped to the surface by a translucent substance or diffuser. The lights 105 display various patterns and colors when an alert or alarm is triggered. For instance, red lights may flash in an emergency, but a series of green lights may flash in a pattern when a routine alarm or alert is triggered. The series of lights 105 are typically light emitting diodes (LEDs), however other types of lights are contemplated by this application. The lights 105 also provide configuration information to the user, for example if the puck needs to be recharged, the lights 105 then display a specific color or pattern to indicate to the user that the puck needs to be recharged. Having the ability to uniquely identify alerts associated with emergencies from those alerts associated with non-emergencies increases the response time of users.

Figure 1B:
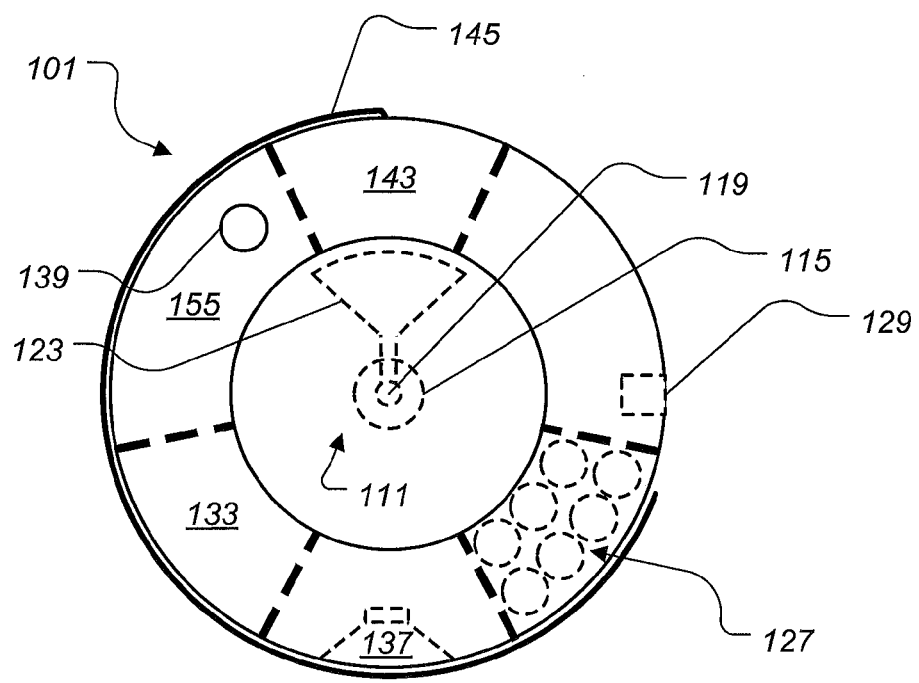
FIG. 1B is a top view of a preferred embodiment of an alerting apparatus according to the present application.

Referring now also to FIG. 1B in the drawings, a preferred embodiment of an apparatus 101 for alerting a user according to the present application is illustrated.

Located inside the puck 101 is a vibration system 111. Vibration system 111 includes an eccentric rotating mass system having a motor 115, a rotatable shaft 119, and a weighed member 123. Shaft 119 is mechanically coupled to the motor 115. Rigidly attached to the shaft 119 is the weighed member 123. When the motor 115 is commanded to spin, the motor causes the shaft 119 to spin. The spinning shaft 119 in turn causes the weighed member 123 to rotate relative to the puck 101 which produces a vibration in the puck 101. The amount of vibration can be adjusted by the speed and acceleration of the motor 115 along with the amount of weight and the offset balance of the weight in the weighed member 123. Other embodiments may comprise arrangements of these connected elements such that the motor, spinning shaft, and eccentric weighted member are oriented in a different direction within the system. Other embodiments of the vibration system 111 include a linear resonant actuator with a weighted member, a piezoelectric crystal, and/or a stepper motor with a weighted member. In those embodiments with a linear resonant actuator the vibration system can provide feedback to the system by measuring the vibrations induced into the linear resonant actuator by the user handling the device, for example the user could stop the alert by shaking the puck 101. Additionally, the vibration system can vary the amount of speed and vibration to create specific patterns of vibration which can be associated with specific alerts and produce patterns of vibrations that meet emergency notification requirements as specified by governing bodies, such as those specified in UL 1971.

In the preferred embodiment, the puck includes a rechargeable battery pack 127. Alternative embodiments of the puck allow for the battery pack to be easily replaceable, such as a 9-volt battery. The pack 127 provides the puck with power and is electrically coupled to the various electrical subsystems of the puck 101. In an alternative embodiment the weight in the weighed member 123 could be partially or completely comprised of a battery pack. This allows the puck to be smaller and weigh less because the weight of the required power storage unit can serve as the required weight for the weighed member 123. The vibration system would then need a slip ring (not shown) to electrically couple the rotatable battery to the electrical system. In the embodiment including a linear resonant actuator the weighted member battery would use a slackened wiring harness to electrically couple the battery to the rest of the system. Typically puck 101 includes a charging port 129 for electrically coupling an external charging device to the puck 101 for charging of battery pack 127. Charging port 129 is preferably a female micro universal serial bus type port or a barrel plug type port, however other charging port configurations are contemplated by this application. Puck 101 includes a battery monitoring system configured for monitoring the rechargeable replaceable battery pack 127. The battery monitoring system provides visual and vibratory feedback to the user regarding the conditions of the rechargeable replaceable battery pack 127. The conditions of the rechargeable replaceable battery pack 127 include: the amount of stored energy in the rechargeable replaceable battery pack 127; the health of the battery cells in the rechargeable replaceable battery pack 127; and/or the need for replacement of the rechargeable replaceable battery pack 127. Visual feedback from the battery monitoring system includes flashing either a specific light, such as a red LED, blue LED, and or green LED, or a pattern of flashing lights, such as a slow decrease in intensity. Vibratory feedback includes having the vibration system 111 produce a specific pattern of vibrations to alert the user to the conditions of the rechargeable replaceable battery pack 127.

Puck 101 includes a plurality of sensors 133, located both interior and exterior to the puck, enabling the puck 101 to measure the environment located near the puck and conditions a distance away from the puck. The plurality of sensors 133 includes motion sensors, buttons, accelerometers, proximity sensors, strain gauges, touch sensors, pressure sensors, temperature sensors, moisture sensors, microphones, and other sensors. The sensor or sensors that measure sound, such as the microphones, are uniquely configured to detect the characteristic sounds of things that a user would want to be alerted of in the event they were unable to hear them normally (i.e., the user is deaf, hard of hearing, at a distance from the sound, or asleep)—sounds such as crying, knocking, yelling, glass breaking, and shouting. The sound sensors and software located inside and outside the puck are configured to analyze the incoming sound and interpret the sound against proprietary data on sound profiles of these specific sounds, including compensation for how the specific sensor's type and location affects the nature of the sound being observed (such as a puck that is placed under a pillow). The motion sensor and proximity sensors included allow the puck 101 to register that the user is moving in close proximity to the puck, so that, for instance, a puck placed next to a sleeping child can alert the mother, by alerting the smart device, if the child moves around. This also allows a user to interact with the puck 101 without actually having to touch the puck 101. For example, also, a user can place an external motion sensor near a door and be alerted by the puck when someone enters the room. The accelerometer allows the puck to measure the amount of movement of the puck relative to a prior location. For example, the puck 101 placed under a pillow, can detect movement by a user that is awakening from sleep. This provides the puck 101 with dynamic feedback information that can be used to adjust the vibration output of the puck as the user either wakes up or falls back asleep. The strain gauges, touch sensors, and pressure sensors are used by the puck 101 to measure the force applied to the puck in a given situation. Similar to the accelerometer scenario above, the strain, touch, and pressure sensor(s) can, for example, when placed under a pillow at night, measure the pressure of a user's head on the pillow, and as the user awakens from sleep and raises their head off the pillow, adjust the amount of vibration in the puck 101 accordingly. An alternative embodiment of puck 101 includes a global positioning system for positional data. This reduces the likelihood of the puck being lost, and also it provides the software application with information regarding the puck's location relative to other sensors and relative to the mobile device to which it is connected wirelessly. Puck 101 is able to communicate directly with external sensors using dual band, redundant communication, wired or wireless, as well as through communications relayed though the associated smart device. For example, the user could have a first sensor mounted to their door to detect knocking, and that sensor causes the puck 101 to vibrate to a specific pattern and/or flash a pattern of lights; however, if the first sensor is outside direct communications with puck 101 or the associated smart device, the first sensor can relay data to a second sensor which may be in communication with the puck 101 or associated smart device.

Puck 101 includes a speaker 137 to allow the puck 101 to generate audible alerts. Puck 101 includes a switch 139 that allows a user to acknowledge an alert or activate a snooze from the puck 101 by moving the switch 139. While the switch has been indicated on the top of the puck, it should be apparent that the switch could be located on other surfaces of the puck 101 or recessed into a surface to prevent accidental activation of the switch. Furthermore, it should be apparent that multiple switches could be used, for example the outer surface 103c or other surfaces could be a pressure sensitive switch enabling the user to merely touch the puck 101 to acknowledge the alert. Alternatively, a strain gauge or pressure sensor is used in addition to or in place of switch 139, measuring the forces on the puck 101, and allowing the user to twist or torque the puck 101 slightly to acknowledge the alert. Alternatively a proximity sensor and/or motion sensors can be used in addition to or in place of switch 139, detecting specific motions near the puck, such as waving of the user's hand over the puck in a certain way, in order to acknowledge the alert. Preferably switch 139 only functions after the puck has vibrated for a set period of time to reduce unintended acknowledgement of the alerts. Puck 101 can utilize an accelerometer or gravity switch to determine when the puck has been flipped over once or twice in a short amount of time, for example 5 seconds, and activate a snooze feature, or turn off the alert or alarm, based on flipping the puck once or twice, dependent upon how the puck is configured by the user.

Puck 101 includes a communication system 143. In the preferred embodiment the communication system includes a wireless signal transmitter and receiver, preferably located on a microchip on the puck 101's circuit board, and antennas, such as antenna 145, coupled to them in order for the puck 101 to send and receive wireless information. The preferred wireless configuration provides the puck 101 with the ability to communicate via a Bluetooth adapter to the smartdevice and to other Bluetooth enabled devices via the Bluetooth, however other wireless configurations are contemplated by this application. For example, the puck, in other embodiments with other wireless protocols such as Zig Bee and Zig Wave, includes a cell phone receiver and transmitter with a SIM card and/or a WIFI interface so that the puck 101 can connect to the global internet. The communication system 143 allows the puck 101 to be in communications, both wired and wirelessly, with external devices such as smart phones, computers, controllers, and external sensors. Communication system 143 provides the puck 101 with a handshaking system to the smart device. The handshaking or pairing of both single pucks and multiple pucks to a single smart device prevents unauthorized users access to the puck 101 and allows the smart device to control several pucks concurrently.

Controller 155, typically located on a circuit or PC board, is electrically coupled to the various subsystems of the puck 101 including the communication system 143, the speaker 137, switch 139, and the plurality of sensors 133, rechargeable and/or replaceable battery pack 127, the charging port 129, the lights 105, and the vibration system 111. Controller 155 takes commands from the software in conjunction with the smart device via the communication system 143 to activate the vibration system 111, the lights 105, and the speaker 137. Controller activates the lights 105 to indicate the rechargeable and/or replaceable battery pack 127 needs to be recharged or replaced. Lights 105 in an alternative embodiment include a red light as a low battery indicator and a blue light for indication of a wireless link between the puck 101 and the smart phone or smart device. A smart phone or smart device includes a screen for displaying information to a user, a processor, local data storage on the smart phone, a wireless interface for connecting the smart phone with other devices on a network, and a wireless interface for connecting the smart phone to the puck 101, and an alerting system for receiving notifications from the smart phone and others across the network. The notifications or alerts could be in the form of text messages, timers, alarms, pushed events, calendars updates, emails, social media notifications such as Facebook and Twitter updates, phone calls, video chats, emergency alerts, and weather alerts. An alternative embodiment includes non-volatile memory for storage of events, alerts, timers, vibration patterns so that the puck 101 can independently alert a user in the case the smart device is turned off or the wireless communication system is not functional. It should be apparent that the internal elements of the puck can be rearranged to increase the functionality of the puck, for example to increase the wireless conductivity and or reduce the power consumption of the device.

Figure 2A:
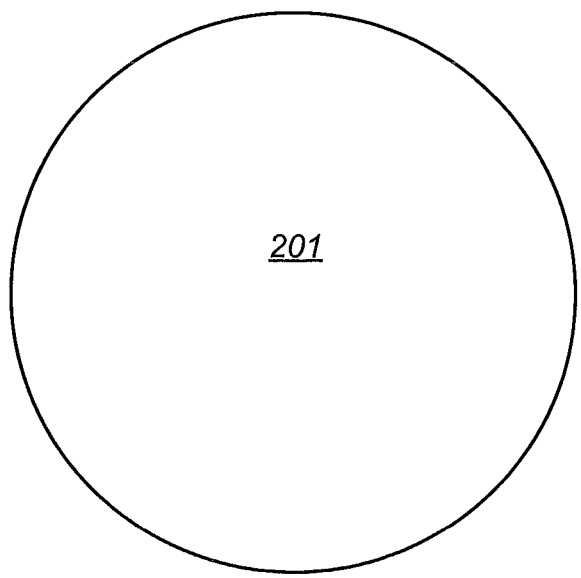
FIG. 2A is a side view of an alternative embodiment of an alerting apparatus according to the present application.
Figure 2B:
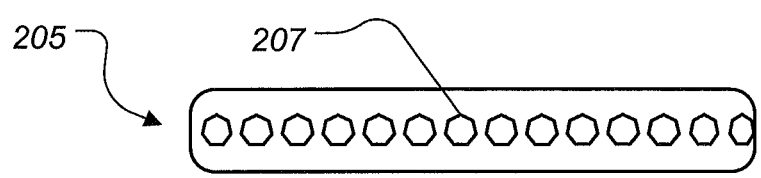
FIG. 2B is a top view of an alternative embodiment of an alerting apparatus according to the present application.

Referring now also to FIGS. 2A and 2B in the drawings, alternative embodiment of an apparatus 201 for alerting a user according to the present application are illustrated. Puck 201 is similar to puck 101 with the similar battery, similar sensors, similar communication system, and similar controller with memory. Puck 201 in contrast to the puck 101 is designed to be a smaller unit with less maintainability than puck 101. The battery of puck 201 is not readily replaceable by the user. Furthermore, the battery of puck 201 is charged by wireless induction of power without use of a plug located on the puck 201. Without having a charging port on the puck 201, the likelihood of moisture invasion of the puck is greatly diminished.

Puck 201 includes a plurality of light emitting diodes (LED) 205 arranged around the outside edge of the puck. Typically, each LED 207 is comprised of three individual LED each with their own color. Typically, there is a red, green, and blue LED closely packed into a single LED 207. Having the ability for the puck 201 to individually control each color of each LED 207 allows the puck to produce a variety of optical patterns of various colors in response to various events. For example, the more important the event, the brighter the intensity of the LED's 205. Additionally, the pattern of lights can be made to match the pattern of vibrations from the puck 201. The pattern of vibrations reflected in the matching pattern of lights will allow the user to recognize, both visually and physically, the source of the noise whether it is a rapid knocking on the door, the repeated pattern of a siren etc.

While single pucks have been illustrated, it should be apparent that multiple pucks can be combined into a single system. This allows a single smart device to set alerts for multiple pucks. For example, a mother could set alerts from her smart phone for herself and her three children, each having their own pucks. Since each would get a different alert they would not have to be woken up at the same time as would be the likely result of a single alarm clock for three children. A combined base would allow a user to charge multiple pucks concurrently. In addition to the multiple pucks, the smart device can be programmed to activate alarms on Bluetooth or Wi-Fi enabled clocks with speakers, lights, and/or displays for messages. This feature provides the user with the ability to coordinate a group of alarms and devices. For example, a mother could set alerts from her smart phone for herself and her three children, each having their own pucks and an alert for her husband's Bluetooth clock to sound at 3:00 pm to start dinner. This feature prevents the user from having to go to several devices separately and set several alarms. Furthermore, each puck can relay information to another puck thereby forming a mesh network amongst the pucks. For example, first puck is in communication with smart device and second puck. However, second puck is out of range of direct communication with smart device, first puck can relay data between second puck and smart device so long as first puck and second puck are in communications with each other.

Figure 3:
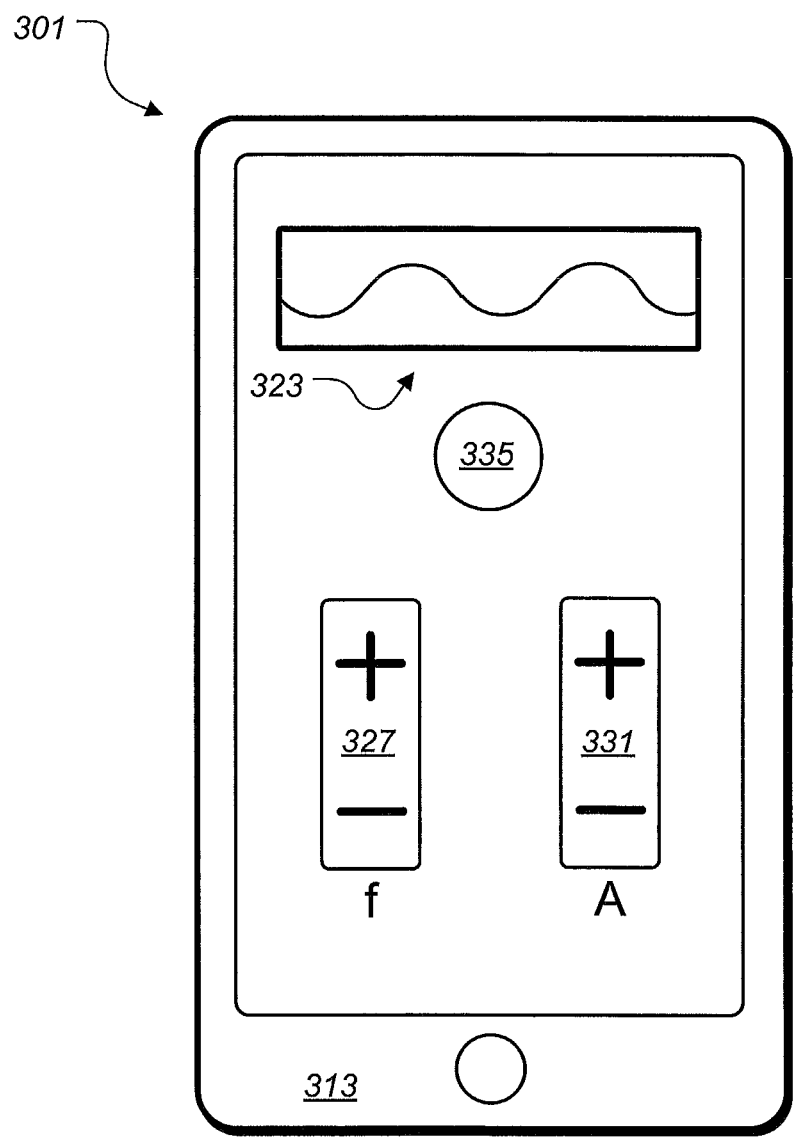
FIG. 3 is a perspective view of a preferred embodiment of a software application according to the present application.

Referring now also to FIG. 3 in the drawings, a preferred embodiment of a software application 301 on smart device 313 according to the present application is illustrated. To interface with the puck 101, software application 301 allows a user to select events, times, alarms, alerts, triggers, and such, so that the puck alerts the user to the various events as programmed by the user. As shown, the software application 301 is programmed to be executed on a smartphone 313, however it should be apparent that other devices such as tablets, computers, smart televisions, smart watches, and other smart devices like wi-fi/Bluetooth enabled clock and other notifications systems, visual notification systems, and such that are able to be paired with the puck 101 and be interfaced with it.

Software application 301 includes the ability for the user to control which event triggers the alert and to specify the type of alert that is produced by the puck. Possible events for triggering alerts include time-based events, signals from remote sensors like door knock sensors, microphones, smoke alarms, and more, plus notifications from a wide range of communication channels such as emails, text messages, social media updates, instant messages, inbound phone calls, and more.

In conjunction with a listening or noise sensing device, the software application 301 can trigger an alert based upon audible inputs, such as a ringing phone, a fire alarm sounding, a smoke alarm sounding, a carbon monoxide alarm sounding, a radon gas alarm sounding, shouting by a person, snoring, knocking, screaming, crying, etc. Software application 301 allows a user to set a plurality of alerts or events related to the various alerts and then configure which methods of alerting are appropriate for each event.

Software application 301 includes the ability of the user to import contacts and calendars, choose from contacts and calendar events stored on the smart device, or input contact characteristics (name, phone number, email address) for the purpose of limiting alerts to occur only when, for example, a text message or other communication arrives from a specific person that is in the contact list, and to specify what type of alert (vibration pattern, flashing light pattern) is generated in that instance. For example, the user sets a single 3 second light vibration for each time the software application 301 registers a text message from a specific person or persons.

The user can also define specific time periods in which alerts triggered by incoming messages, texts, calls, and other sources are allowed to vibrate the puck. Software application 301 allows the user to designate any alert as an "emergency" alert which automatically triggers the strongest vibration and the most noticeable LED patterns.

Software application 301 also connects puck 101 to an Internet-based service consisting of additional software (a server), capable of receiving mass notifications from local, state, and federal governments. For example, FEMA sends a message warning of a hurricane to residents of a certain area, and the puck 101 in conjunction with software application 301 vibrates and alerts the user. The aforementioned message from FEMA in some embodiments is in the form of a widespread SMS/Text message directed to a list of users that provided their contact information to FEMA or alternatively in a form such as a notice where FEMA doesn't have a contact number or an email address of the user, like a bulletin. The aforementioned service would be hosted externally and would act as a clearing house or directory of emergency alert services. It would provide the ability for the user to more easily identify, select, and enroll in alerts from one or more emergency management agencies (e.g. FEMA) or any other publishers of emergency information. The aforementioned service would also allow a user such as a hospital administrator to create a group notification list whereby specific alerts could be forwarded simultaneously to all participating doctors on staff via their respective smart devices and pucks. The aforementioned Internet-based service would also enable the user to easily and automatically configure their web-enabled smart device to produce specific alerts in response to various events. An example of this capability is anticipated in Israel, where users of the puck can rely on the puck's strong vibrations in response to air raid alerts, both in audible form from an external sensor and in from an inbound electronic message such as a text or email, from the government.

The vibration strength of typical cell phones is limited and not readily customizable; the sheer number of emails, texts, and phone calls that many cell phone (smart phone) users is large, and important events can end up being ignored because of the high number of events overall. The application in conjunction with the puck provides the user with a way to selectively receive alerts based on only the most important events as defined by the user.

Software application 301 includes a visual representation 323 of vibration output of the puck 101. Visual representation 323, can also be reproduced through light emitted from the LED's or wirelessly connected smart light-bulb. The visual representation provides a user with the ability to visually see the vibration pattern or the expected vibration output over a time period. The user can customize the vibration pattern by adjusting: the duration of the vibration output of the puck, including the start time, stop time, intensity, and duration of the vibration. Furthermore, the user can make the pattern repeat, ramp up, ramp down, a square pattern, a sinusoidal pattern, a saw pattern, intermittent, or combination of any of these types. The patterns can also be made to represent real world vibrations or sounds, such as trains passing, sirens, ocean waves crashing, door knocking, etc. For example, the user can set the puck 101 to produce minimal vibrations at the start of the alert but as time passes the intensity of the vibration is increased in response to the passing of time. Software application 301 allows a user to manually adjust the frequency 327 and the amplitude 331. Icon 335 is a representation of the puck 101 on the display of the smart device 313. As the user adjusts the vibratory output of the puck, the smart device 313 can activate the vibration feature of the smart device 313 to give the users a physical representation of the expected output of the puck 101. Furthermore, the icon 335 displays the quality of the wireless connection between the smart device 313 and the puck 101. User is able to select the icon 335, thereby producing a vibration from the puck 101, therefor testing the system. This feature allows the user and the system to realize the puck is not in communication with the smart device 313. This prevents a user from missing an alert because the puck is out of range or out of charge. The smart device can be configured to prevent an alert from being set if no puck 101 is connected or if no alert can stored in the memory of the puck itself. Additionally, if the connection with the puck 101 is corrupted or lost, the smart device will alert the user of the lost connection. The nature of the alert will appear on a home screen on the smart device 313, notifying the user of the act nature of the alert, e.g. emergency vs. a personal alert/alarm.

Preferably the software application 301 sets the configuration for puck 101 and doesn't need to remain in communications with the puck for certain events. Therefore, if the smart device is unavailable the puck would still alert the user to the specified event. The configuration information sent to the puck 101 includes at least: when to alert, the type of alert; and the duration of alert. Alternatively, the puck 101 only vibrates in direct response to commands from the software application 301 running on the smart device 313.

Figure 4:
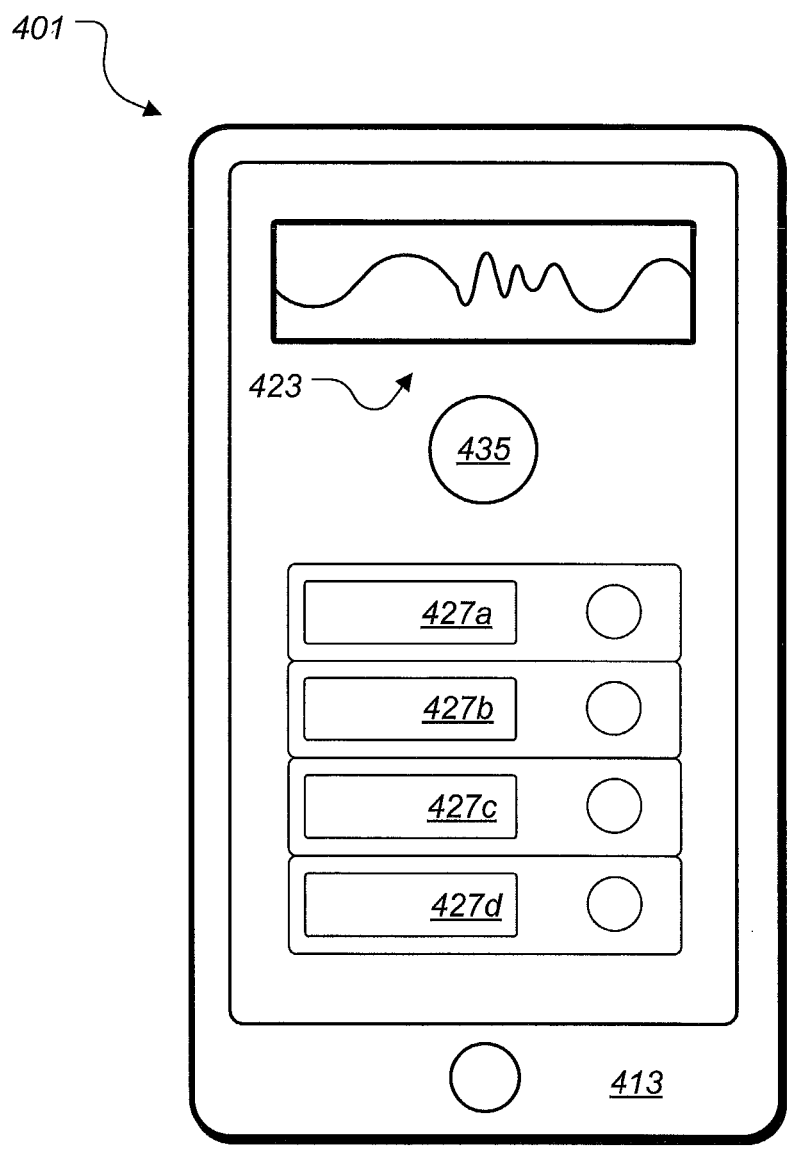
FIG. 4 is a perspective view of an alternative embodiment of a software application according to the present application.

Referring now also to FIG. 4 in the drawings, an alternative embodiment of a software application 401 on smart device 413 according to the present application is illustrated. Software application 401 includes a visual representation 423 of vibration output of the puck 101. If the user has music stored on the smart device 413, the software application 401 gives the user the ability to select tracks of music from the stored music on the smart device 413, such as track A 427*a*, track B 427*b*, track C 427*c*, or track D track 427*d*. The user can scroll through a listing of their music and select the track to replicate in a vibration pattern that is compatible with the vibration system of puck 101. While music inherently is vibratory, if a song has a pattern at a high frequency such as 3,500 Hz a user typically cannot feel the pattern from vibrations without high amplitude. The system can then apply the musical waveform to the vibratory waveform such that output of the vibration system of the puck 101 is similar in beat to that of the selected music track. Additionally, the system is able to pattern vibratory patterns based upon musical notes or other patterns. For example, the system can convert a digital music file from an audible form into a sensory form. This process converts the frequencies of the audible file from their high frequencies, such as 500 Hz-20,000, into low frequencies, such as 1-500 Hz through frequency shifting. Therefore, the user can feel the pattern of the song as opposed to hear it. Shifting and scaling the music to provide musically inspired vibratory wake up patterns increases the quality of life for those that are deaf and hard-of-hearing as they cannot use a standard alarm radio to be awoken by their favorite music because they cannot hear the music over the speaker. Icon 435 is a representation of the puck 101 on the display of the smart device 413.

An alternative embodiment of puck 101 includes the ability of the user to adjust the duration, intensity, and the pattern of the vibration. Furthermore, the user is able to program the puck 101 via the smart device 413 with a specific pattern, for vibrations or lights, in response to a specific alert. For example, the user would typically set the vibration to max intensity, duration, and an abrupt on-off pattern repeating indefinitely for an emergency-type alert, such as a tornado warning text. The user would then reduce the intensity and duration and make the pattern less abrupt for alerting them that a visitor was at a door knocking. Alternatively, the pattern of the lights or vibrations can mimic the pattern of the source. For example, the pattern of vibration emitted by the puck 101 matches the vibrations of footsteps sensed or the light pattern of the LED's matches the cadence of a phone ringing thereby helping someone both hearing and visually impaired.

Additionally, the system is able to utilize a feedback loop to determine how best to wake a user based on their sleep cycle. The system utilizes the variety of sensors to measure the sleep pattern of the user. Typically, the system measures the user's restlessness with motion sensors, accelerometers, and strain gages, as well as the temperature of the user with thermocouples. This also provides the system with the ability to check if the user is awakening in response to the vibrations. The system can modify the vibration intensity to awaken the user if a lower setting doesn't appear to be working after a period of time. Inputs from the various sensors are cross-referenced with a database of information that allows the system to interpret the sensor information based on the location of the puck (i.e., under a pillow, below a mattress, on a table, in a coat pocket). Since movement, sound, pressure, etc will all be received differently by the sensors, based on the location of the puck itself, a proprietary database of information is critical to interpreting a signal from one of the onboard sensors. For instance, a noise heard from under the pillow will be different than one heard from on top of a table. Similarly, movement from someone waking up will need to be interpreted differently based on whether the puck is located below the person's head under the pillow, or under the mattress itself. The proprietary database will be cross-referenced and the appropriate analysis will then be possible. Typically, the system is programmed via a smartphone or tablet by way of a computer based software application. Additionally, the system can share data with enuresis or sleep apnea equipment to provide conditional information to the sleep apnea machine, as well as, receive a signal from the sleep apnea machine to alert the user with a specific vibration.

Figure 5:
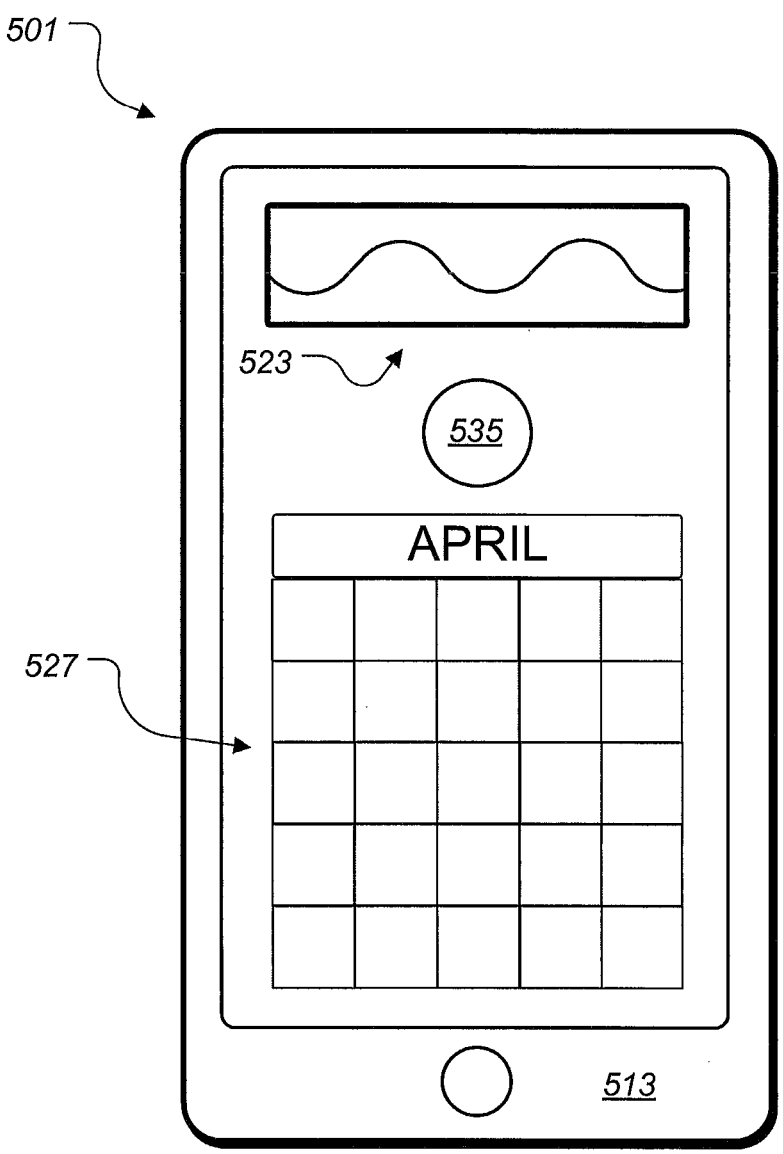
FIG. 5 is a perspective view of an alternative embodiment of a software application according to the present application.

Referring now also to FIG. 5 in the drawings, an alternative embodiment of a software application 501 on smart device 513 according to the present application is illustrated. Software application 501 includes a visual representation 523 of vibration output of the puck 101. The user of software application 501 can set an alert based on their calendar 527. Preferably calendar 527 is imported from their cloud based calendar and allows the user to remotely set the software application 501 to vibrate from an appointment set remotely to the smart device 513. The user is able to set different patterns for the different types of alerts. For example a text message alert might be shorter with less intensity and an alarm might be longer duration with maximum intensity. Software application 501 includes an icon 535 that is virtual representation of the puck 101 and vibrates as the puck 101 vibrates. Software application 501 is configured to allow a user to adjust the snooze settings, repeat alerts and alarms, the type of waking, the duration, the gradients or vibration patterns, emergency alert responses, and default settings for both the vibrations as well as the LED lights. The software application 501 is integrated with other software on the smart device 513. When the smart device receives a phone call the software application 501 sends a predetermined vibration and/or LED pattern to the puck 101. Specific contacts from the smart device 513 can be assigned specific vibration and LED patterns from the software application 501. The software application 501 could be of several different versions, such as a free version and a paid version, with various levels of features enabling the manufacturer or publisher the ability to customize the software to the type of customer.

The software application 501 provides the user the ability to select exactly how the puck 101 will react to the alarms or alerts (hereinafter described as simply "alerts"). The user can select whether the puck 101 will vibrate, flash, and sound an audible alarm, both in conjunction with and without other peripherals, based at least on the type of alert, the urgency of the alert, the time of the alert, what to do if the alert is not acknowledged in a certain period of time and/or the source of the alert. Furthermore, the user can customize the vibrations, the flashing, and the sounds based at least on the type of alert, the urgency of the alert, the time of the alert, what to do if the alert is not acknowledged in a certain period of time, and/or the source of the alert. User is able to set a timer with a period of time and at the end of the time the puck 101 will vibrate to alert the user. For example, the user wishes to take an hour nap, they would set an hour timer and then be awoken by the vibrations and lights from the puck 101 in an hour.

Referring now also to FIG. 6A in the drawings, an alternative embodiment of a software application 601 on smart device 613 according to the present application is illustrated. First server 615 is a computer based system having a microprocessor in conjunction with local memory connected to a data network. First server 615 typically is maintained by a federal agency, such as FEMA, and utilized as a source for the public for emergency alerts. The emergency alerts can be in the form of a text message, a phone call, a video message, a webpage, a SMS message, an email, or a document. While only one server is shown, it should be apparent that multiple servers can be in communication with software application 601. It is expected that each federal and state agency would maintain control of their own servers such as first server 615. Software application 601 transmits user data 617a to the first server 615, such as a zip code or GPS coordinates, and first server 615 transmits location specific alerts 617b to the software application 601. Software application 601, based upon user's inputs, selectively determines which alerts from the first server 615 are then relayed 617c to the puck 101 for alerting the user. Additionally, alternative embodiments of puck 101 can receive alerts 617d directly from the first server 615 and bypass smart device 613 if for example the battery on the smart device is drained.

Referring now also to FIG. 6B in the drawings, an alternative embodiment of a software application 601 on smart device 613 according to the present application is illustrated. In this alternative embodiment the puck 101 transmits data 617e back to the smart device 613 and the software application 601. The transmitted data 617e from the puck 101 includes: acknowledgement that the alert was received; conditional information such as temperature, orientation, accelerations, and strains; positional information such as latitudes and longitudes of the puck; and snooze signals. Furthermore, it should be apparent that transmitted data 617e can be further relayed back to first server 615 for data collection.

Figure 7A:
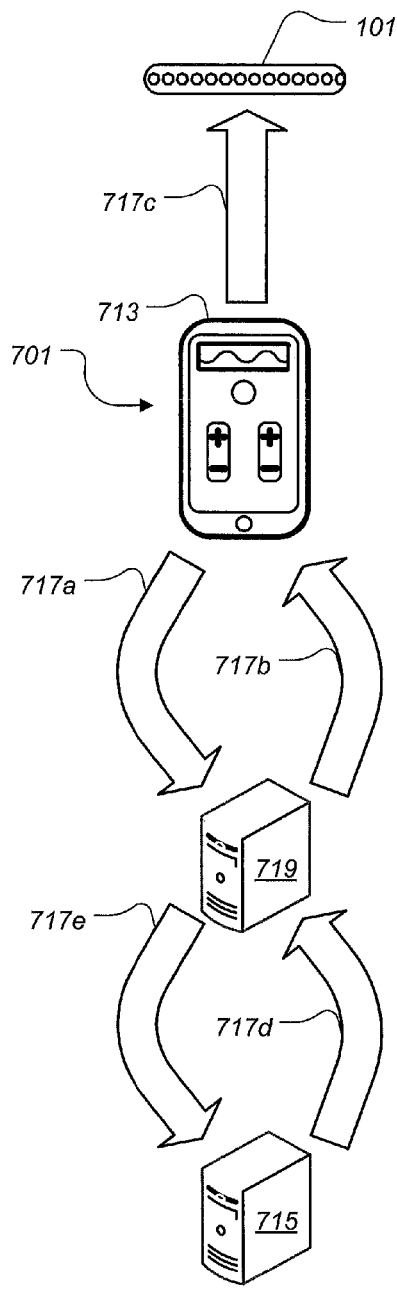
FIG. 7A is a flowchart of an alternative embodiment of a software application according to the present application.

Referring now also to FIG. 7A in the drawings, an alternative embodiment of a software application 701 on smart device 713 according to the present application is illustrated. First server 715 is a computer based system having a microprocessor in conjunction with local memory connected to a data network. First server 715 typically is maintained by a federal agency, such as FEMA or NOAA, and utilized as a source for the public for emergency alerts. While only one server is shown, it should be apparent that multiple servers can be in communication with software application 701. It is expected that each federal and state agency would maintain control of their own servers such as first server 715. Second server 719 is a computer based system having a microprocessor in conjunction with local memory connected to a data network. First server 719 typically is maintained as a clearinghouse specifically for alerting puck users. Software application 701 transmits user data 717a to the second server 719, such as a zip code or GPS coordinates, and second server 719 transmits location specific alerts 717b to the software application 701. Software application 701 in conjunction with second server 719 selectively determines which alerts from the first server 715 are then relayed 717c to the puck 101 for alerting the user. Each puck 101 includes a unique identifier, such as an internet protocol number, so the system can identify each puck uniquely. Second server 719 receives alerts 717d from first server 715. Second server 719 transmits data, such as location information, 717e to first server 715.

Software application 701 in conjunction with second server 719 and first server 715 aggregates the alerts by creating a listing of possible alerts the puck user can sign up for based upon the location of the user. A user of the puck though the software application 701 selects which alerts to subscribe to through the smart device 713. Use of second server 719 by a user of the puck 101 is through a subscription model where the user pays a fee on an interval for the server to monitor and relay alerts from the first server 715 to the smart device 713. Furthermore, second server 719 stores enterprise wide alerts to send alerts to multiple pucks around the world concurrently. For example a hospital could notify all employees of an emergency call up by providing pucks connected to the second server 719. The hospital is able select a group of employees at a certain facility to all receive the same alert to report to work. Another example includes a news corporation providing alerts to users based upon news alerts or social media outlets.

Figure 7B:
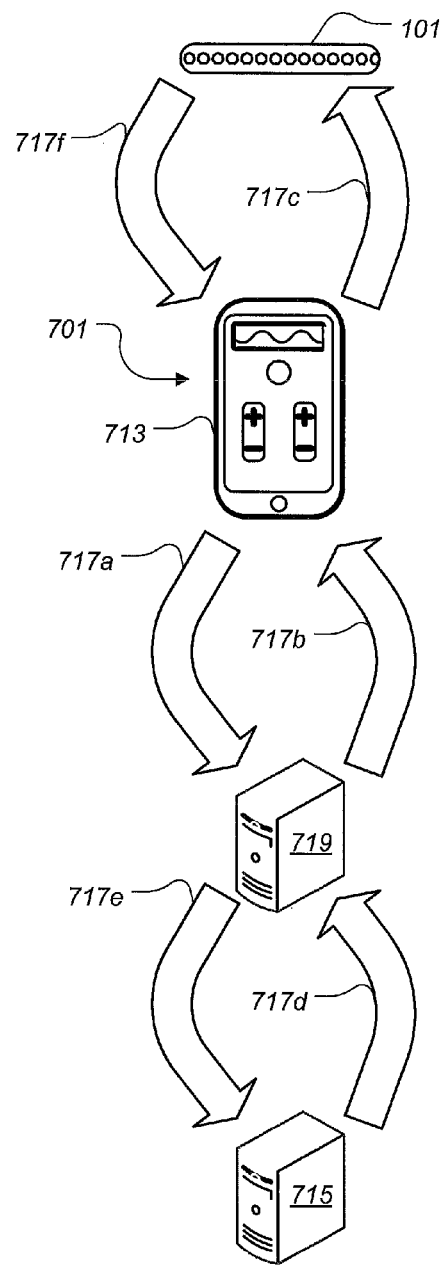
FIG. 7B is a flowchart of an alternative embodiment of a software application according to the present application.
Figure 8:
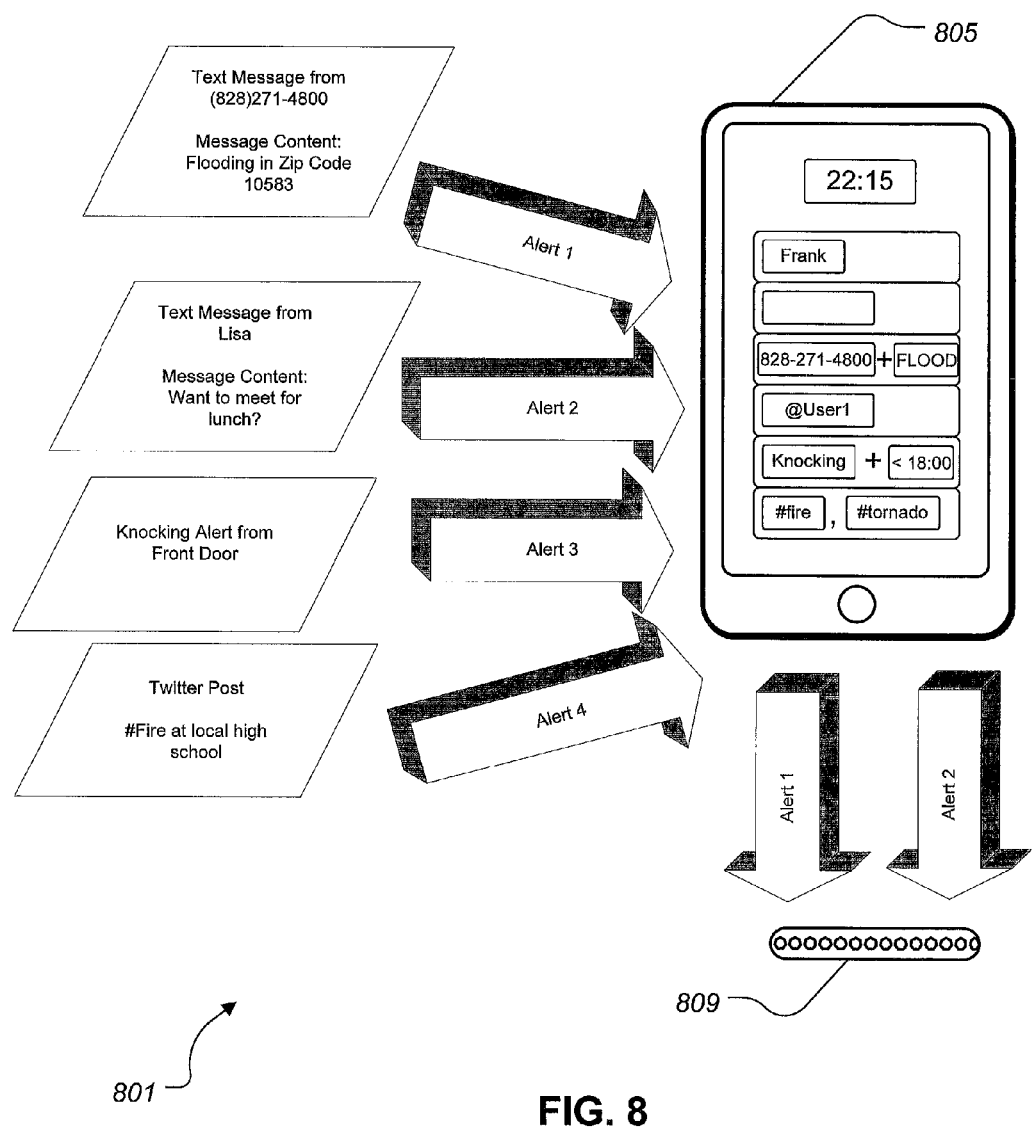
FIG. 8 is a flow chart of an alternative embodiment of an alerting system according to the present application.

Referring now also to FIG. 7B in the drawings, an alternative embodiment of a software application 701 on smart device 713 according to the present application is illustrated. In this alternative embodiment the puck 101 transmits data 717f back to the smart device 713 and the software application 701. The transmitted data 717f from the puck 101 includes: acknowledgement that the alert was received; conditional information such as temperature, orientation, accelerations, and strains; positional information such as latitudes and longitudes of the puck; and snooze signals. Furthermore, it should be apparent that transmitted data 717f can be further relayed back to both first server 715 and second server 719 for data collection.

Smart device 713 in conjunction with software application 701 is able to provide the user the ability to define how various alerts are indicated or announced to the user a distance away from the puck 101. In addition to controlling the LED's which are present in the puck 101, software application 701 allows users to broadly control radio controlled lightbulbs, such as the Hue system, to indicate alerts to users. The color, the intensity, and the pattern of the lights can be coordinated by the user through the software application 701 to provide flexibility to the user's notification of alerts. For example, when software application senses a fire, via connected sensors, the software application 701 changes the lighting of all the rooms to a red color to alert the user of a fire. Furthermore, software application 701 when connected to a water detection sensor can change the lighting from white lighting to blue lighting in response to a water leak. A door knock sensor, connected to the smart device, allows a user to sense a door knock as the lights in a room flash in response to a knock at a door. Colors and patterns can be assigned to various types of alerts such that a particular number of a phone call or text message generates a particular color as assigned by the user in the software application 701. For example, a user selects an orange light alert when their father messages them, as the father's college color is orange. The ability to visual see the alerts through the Bluetooth and wifi connected lightbulbs is in conjunction with vibrating the puck 101. Preferably the alert will make it to the user no matter the path.

Users with visual impairment need audible confirmation of the system's configuration; therefore software application 701 is able to recognize human speech as an input to the smart device 713. For example, a user can speak to software application 701 and command it to vibrate the puck 101 and flash the lights nearest the bed in response to a particular number. This provides the user an easy way to set reminders and configure how the system will respond to predetermined alerts. Furthermore, the software application is able to provide feedback to the user in an audible form so that the user can hear the conditions of the software application 701. For example, the user can speak to the software application 701 asking what the response will be from an emergency alert from the government and the software application 701 will generate a spoken response understandable to the user telling the user that the puck 101 will vibrate until acknowledged and all lights connected to the software application 701 will flash until acknowledged by the user.

System 801 is comprised of a smartdevice 805 and a puck 809. As the smartdevice is signaled with text messages, phone calls, emails, social media posts, and other notifications, users need a system and method to reduce the amount of notifications to the puck. The system monitors all notifications from the smartdevice. Once a notification is detected, the filters, as set by the user, help the system to determine if the puck is vibrated in response to the alert. A user is able to configure the smartdevice 805 with a "What you see is what you get" WYSIWYG interface to watch for only specific alerts that meet specific conditions and characteristics from the variety of various sources. The user can select contacts, words, senders, recipients, sources, types, numerical conditions, and times as filters and combine them together to make more selective filters. Logical statements, such as AND +, OR, NOT −, ELSE, GREATER THAN >, LESS THAN <, EQUALS =, are provided to the user to allow them to arrange and combine filters as needed to create more complex conditional filters. As shown the user created a filter for certain alerts to make it to the puck. Some alerts are scanned for additional filter elements such as specific word, phrases, or numbers in the content of a text message, email message, or other notification. For example, in alert one, a text message from phone number (828)271-4800 will vibrate the puck because the text message also contains the desired term "FLOOD". Alert two, a text message from Lisa, will not be transmitted to the puck because the sender Lisa is not on the list defined by the user. Alert three, a signal from the door knock sensor on the front door, will not make it to the puck because the user added a clock filter and the time of the knock was after the allowed time set in the filter. Alert four, a Twitter post about a local high school fire does make the puck vibrate because of the hashtag #fire. Text messages arrive at the smart device, and the notifications in the smart device signal the alerting software to analyze the incoming message, call, or email based on the filters that have been set. If preset conditions are met, then the software triggers the puck to flash or vibrate.

Additionally the system is able to analyze signals from the onboard sensors of the puck and from other connected sensors to determine the type of sounds present in the room where the puck or sensor is located. Preferably the system includes a proprietary library of signals that characterize typical sounds such as voices, glass breaking, door knocking, banging, falling, screams, water noises and cross references the noise with the location of the sensor or puck to display to the user an alert and location of the alert. Additionally the system characterizes the output of a pressure sensor and accelerometer located on the puck to determine whether the user has awoken and rose from slumber in response to alerts from the puck.

System 801 further comprises an emergency mode wherein the functionality of the system is modified in response to an emergency. The user can designate any given alert as an emergency alert category. Thereby automatically setting the vibration resulting from the alert to a predetermined strength and pattern, while changing the color of the LED's to a predetermined pattern and or color.

The system helps users inundated with repetitive notices focus on critical alerts. For example, the system can be configured to filter out repetitive alerts until a second alert or action is completed. For example, a user may set the system to ignore a door knock sensor until a text message from a food delivery provider has been received by the system.

Additionally the system is able to be integrated with home network devices that are capable of providing alerts such as text messages, data messages across a shared computer network, or Wi-Fi network. For example, an improved thermostat sending a text message to a user about the sudden drop in temperature of the upstairs bedroom can drive the system to activate the puck. Medical devices, such as insulin pumps, provide notifications to users through weak audible notifications and possible text messages. The system is able to monitor and relay critical alerts to users from medical devices. Alerts from medical devices can be flagged or grouped, to not be filtered by the system, because of the potential critical nature of alerts from medical devices.

It should be apparent that the system alternatively comprises an application programming interface, or API, enabling the application 301 on the smart device and the puck 101 to be in communication with external devices, such as cell phones, door knock sensors, smoke alarms, carbon monoxide detectors, alarm clocks, music players, home automation controllers and base stations, window sensors, door-open sensors, smart lighting, emergency pendants, and more, from a variety of manufacturers. This proprietary API will allow third-party manufacturers to communicate with and control the application 301 and the puck 101, and for the application 301 and the puck 101 to control devices made by third-party manufacturers.

The systems and methods described above provide several distinct advantages over previous alerting systems. Typical users of this system are those that are deaf, hard of hearing, and/or blind; and they obtain advantages from the extra sensory information from the lights and vibrations to notify people whether they are deaf, blind, both, or neither. The system provides a user with a convenient alerting system that provides feedback to the system and is aware of the conditions in the environment surrounding the user of the puck, and the information being received in real time into the smartphone/computer/tablet control device. The system provides the user with a method of customizing the type of alert. Additionally, the system can customize the alerts and the various ways of notifying the user of an alert as it is triggered to each specific user. The puck in combination with the smart device and software allows users to combine several independent alerting systems into a unified system providing one interface for many different types of emergency and non-emergency alerts.

The invention claimed is:

1. A system for alerting users comprising:
   a smart device for controlling alerts, the smart device having;
      a screen for allowing a first user and a second user to input a first alert and a second alert and selecting a first vibratory pattern in response to the first alert and a second vibratory pattern in response to the second alert; and
      a first wireless system;
   a first puck having;
      a second wireless system for interfacing with the smart device via the first wireless system;
      a first vibration system configured for shaking the first puck;
      a first controller for activating the first vibration system in response to a first signal from the smart device; and
      a feedback sensor for measuring a sleep pattern of the users; and
   at least a second puck having;
      a third wireless system for interfacing with the smart device via the first wireless system;
      a second vibration system configured for shaking the second puck; and
      a second controller for activating the second vibration system in response to a second signal from the smart device;
   wherein the screen allows the first user to input an identical alert having a third vibratory pattern in response to the identical alert;
   wherein the smart device controls the identical alert concurrently for both the first puck and the second puck;
   wherein the first controller adjusts the first vibration system in response to the feedback sensor; and
   wherein the first controller determines the location of the first puck based upon the feedback sensor.

2. The system according to claim 1, further comprising:
   a first server;
   wherein the smart device is in electronic communication with the first server; and
   wherein the first server configures and stores alerts specifically for the first puck and for the second puck.

3. The system according to claim 1, further comprising:
   an accelerometer;
   wherein the first puck is configured to acknowledge the alerts by sensing a change in the accelerometer due to movement of the first puck.

4. The system according to claim 1, further comprising:
   a filter;
   wherein the smart device is configured for selectively limiting alerts from sources outside the smart device based upon the filter.

5. The system according to claim 1, the first puck further comprising:
   memory coupled to the controller, configured for storage of alerts so that the controller can activate the vibration system without being continuously connected to the smart device.

6. The system according to claim 1, wherein the smart device is configured for changing a musical track into a vibratory pattern for the vibration system; and
   wherein the smart device scales and shifts a frequency of the musical track.

7. The system according to claim 1, further comprising:
   an acoustic sensor located outside the first puck;
   wherein the acoustic sensor is in communications with the system for alerting users;
   wherein the vibration system is activated in response to a signal from the acoustic sensor; and
   wherein a pattern of a vibration produced from the vibration system is based upon a pattern of the signal from the acoustic sensor.

8. The system according to claim 1, further comprising:
   wherein the smart device controls separate alerts for both the first puck and the second puck.

9. The system according to claim 1, further comprising:
   a first series of lights; and
   a second series of lights;
   wherein the first series of lights flash in response to alerts; and
   wherein the second series of lights flash in response to emergency alerts.

10. The system according to claim 1, further comprising:
    a first light;
    wherein the first light flashes in response to alerts.

11. A method for alerting a user comprising:
    creating a list of contacts comprising approved contacts;
    receiving a message from an external source;
    setting an alert on a device;
    establishing a rule to limit alerts from the message received from the external source based upon the list of contacts;

programming a puck to vibrate in response to the alert based upon a vibration pattern;
vibrating the puck in response to the alert;
measuring a sleep pattern of the user;
measuring a location of the puck;
comparing the location of the puck to a database of puck locations;
comparing the sleep pattern of the user to a database of patterns of sleep; and
adjusting the vibration of the puck based upon the location of the puck and in response to the sleep pattern of the user in order to awaken the user;
wherein the device allows a user to customize the vibration pattern associated with the alert.

12. The method according to claim 11, further comprising:
setting an alert based on an external event from an external source having a sender;
creating a filter to selectively limit the alert resulting from receiving the external event;
filtering the external event based upon the filter;
setting an alert based on an external event from an external source on the device if the sender of the external event is on the list of contacts;
vibrating the puck in response to the alert on the device if the sender of the external event is on the list of contacts;
ignoring the alert if the sender of the external event is not on the list of contacts.

13. The method according to claim 11, further comprising:
importing a calendar from the device;
wherein setting the alert is based on information imported from the calendar.

14. The method according to claim 11, further comprising:
designating the alert as an emergency alert;
flashing a series of emergency lighting elements located on the puck in response to the alert designated as the emergency alert; and
generating an audible alarm from the puck in response to the alert designated as the emergency alert;
wherein flashing the series of emergency lighting elements in response to the alert is maximized in response to the alert designated as the emergency alert; and
wherein vibrating the puck in response to the alert is maximized in response to the alert designated as the emergency alert.

15. The method according to claim 11, further comprising:
establishing a communication channel between the device and puck;
checking the communication channel between the device and the puck; and
alerting the user if the communication channel between the device and the puck fails.

* * * * *